(12) United States Patent
Hiruma

(10) Patent No.: US 7,794,781 B2
(45) Date of Patent: Sep. 14, 2010

(54) FILM FORMATION METHOD, ELECTRO-OPTICAL DEVICE MANUFACTURING METHOD AND ELECTRONIC APPARATUS

(75) Inventor: Kei Hiruma, Chino (JP)

(73) Assignee: Seiko Epson Corporation (JP)

( * ) Notice: Subject to any disclaimer, the term of this patent is extended or adjusted under 35 U.S.C. 154(b) by 1026 days.

(21) Appl. No.: 11/333,707

(22) Filed: Jan. 17, 2006

(65) Prior Publication Data

US 2006/0164591 A1    Jul. 27, 2006

(30) Foreign Application Priority Data

Jan. 21, 2005    (JP)    ............... 2005-013722

(51) Int. Cl.
*B05D 5/12* (2006.01)

(52) U.S. Cl. .................. 427/58; 427/69; 427/96.2; 427/98.3; 349/155; 349/187; 438/26

(58) Field of Classification Search .................. 427/58, 427/69, 96.2, 98.3; 349/155, 187; 438/26
See application file for complete search history.

(56) References Cited

U.S. PATENT DOCUMENTS

| 5,234,760 A * | 8/1993 | Berteaud et al. ............ 428/332 |
| 7,265,806 B2 * | 9/2007 | Ueda ......................... 349/155 |
| 2005/0079644 A1 | 4/2005 | Sakurada |
| 2005/0151890 A1 * | 7/2005 | Nishimura ................... 349/20 |

FOREIGN PATENT DOCUMENTS

| JP | 11-142641 | 5/1999 |
| JP | 2003-225600 | 8/2003 |
| JP | 2004-144849 | 5/2004 |
| JP | 2004-223354 | 8/2004 |
| KR | 2004-81005 | 9/2004 |

* cited by examiner

*Primary Examiner*—Nadine G Norton
*Assistant Examiner*—Maki A Angadi
(74) *Attorney, Agent, or Firm*—Harness, Dickey & Pierce, P.L.C.

(57) ABSTRACT

A film formation method includes: ejecting liquid onto a substrate; and drying the liquid ejected onto the substrate by a drying device before an amount of a solvent evaporation of the liquid exceeds 40%.

9 Claims, 7 Drawing Sheets

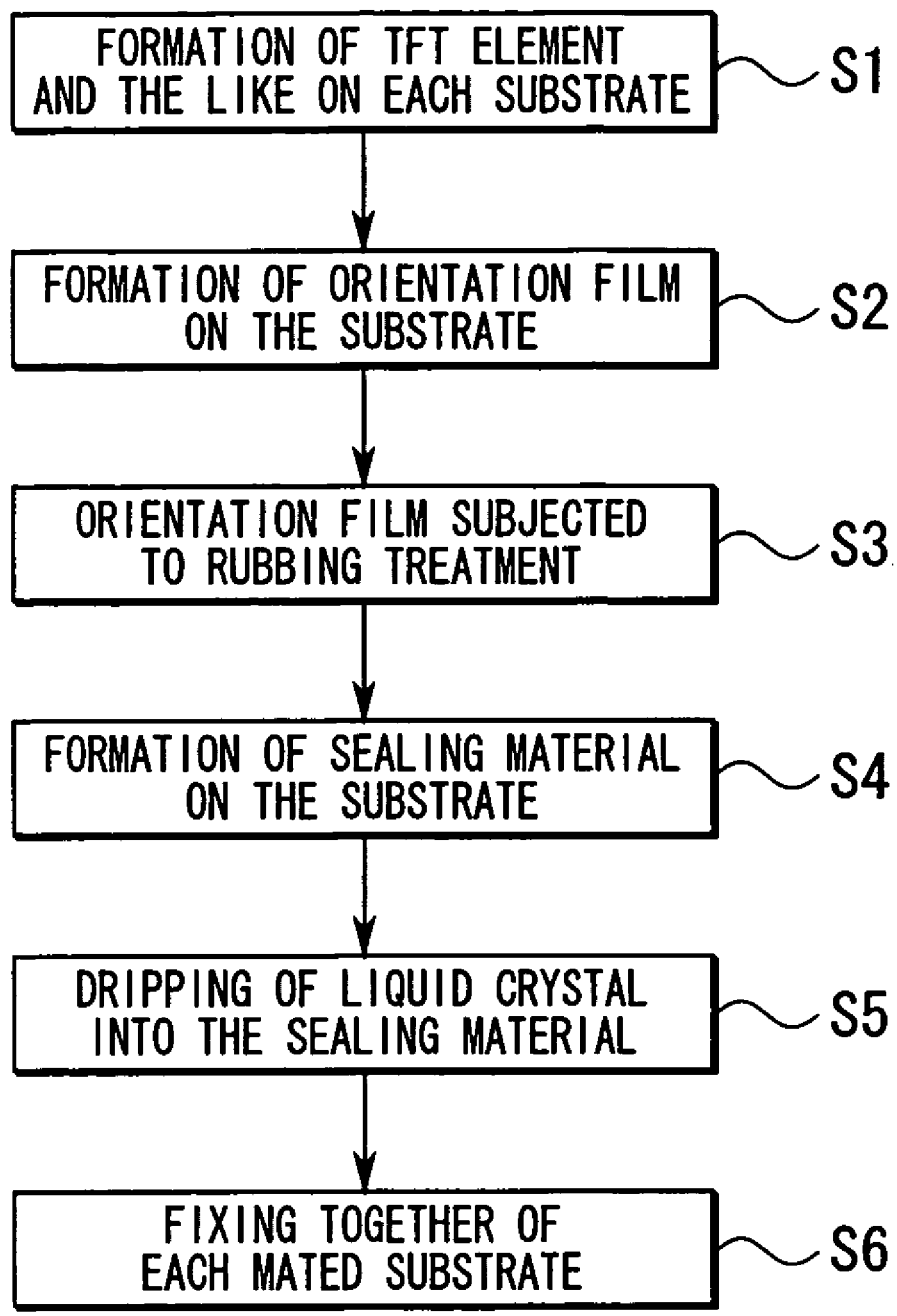

FILM FORMATION METHOD, ELECTRO-OPTICAL DEVICE MANUFACTURING METHOD AND ELECTRONIC APPARATUS

CROSS-REFERENCE TO RELATED APPLICATION

With regard to this type of film formation device, for example, Japanese Unexamined Patent Application, First Publication No. 2003-225600 discloses a thin film formation device provided with an ink application device and a baking device. This thin film formation device connects the ink application device and baking device. The thin film formation device forms a thin film with thickness uniformity by baking the substrate after the passage of time (delay time) in which a liquid applied to the substrate surface by the application device has flowed and become substantially level.

BACKGROUND

1. Technical Field

The present invention relates to a film formation method, an electro-optical device manufacturing method, and electronic apparatus.

2. Related Art

In liquid crystal devices, orientation film with the function of arranging liquid crystal molecules is applied and formed by the flexo method and the spin-coating method. In recent years, for purposes of economizing material and accommodating high quality, studies have been conducted concerning use of a liquid droplet ejection method (a liquid droplet ejection apparatus) for forming orientation film by ejecting liquid containing orientation-film-forming material as liquid droplets from a ejection head.

With regard to this type of film formation device, for example, Japanese Unexamined Patent Application, First Publication No. 2001-127206 discloses a thin film formation device provided with an ink application device and a baking device. This thin film formation device connects the ink application device and baking device. The thin film formation device forms a thin film with thickness uniformity by baking the substrate after the passage of time (delay time) in which a liquid applied to the substrate surface by the application device has flowed and become substantially level.

However, the following problem exists with the aforementioned type of prior art. In the case where forming a film by liquid droplet ejection method using a high dryability ink, drying also progresses in the delay process until the liquid droplets have leveled, with the result in that, for example, there is the risk of drying irregularities due to the occurrence of protrusions and the like prior to the drying (baking) process.

In such cases, in display devices having a substrate on which film has been produced, the places where drying irregularities have occurred constitute display irregularities, and induce declines in display quality.

SUMMARY

An advantage of some aspects of the invention is to provide a film formation method that does not cause drying irregularities even in cases where liquid of high dryability is used, an electro-optical device manufacturing method enabling prevention of declines in display quality, and electronic apparatus.

A first aspect of the invention provides a film formation method, including: ejecting liquid onto a substrate; and drying the liquid ejected onto the substrate by a drying device before an amount of a solvent evaporation of the liquid exceeds 40%.

Here, a percentage value of the amount of the solvent evaporation means a decrement weight of the solvent by evaporating the solvent after ejecting liquid onto the substrate, based a weight of the solvent included the liquid before ejecting liquid. Hence, the percentage value of the amount of the solvent evaporation before ejecting liquid is 0%. Since, the solvent of the liquid ejected onto the substrate is started evaporation, the percentage value of the amount of the solvent evaporation after ejecting liquid is increase.

As declines in display quality due to drying irregularities have been found by experimentation when the amount of a solvent evaporation of the liquid applied to the substrate exceeds 40%, this invention enables prevention of the occurrence of drying irregularities by drying the substrate to which the liquid has been applied before the amount of the solvent evaporation of the liquid exceeds 40%.

It is preferable that the film formation method of the first aspect of the invention further include: measuring the amount of the solvent evaporation based on elapsed time from starting the ejecting of the liquid onto the substrate.

Consequently, according to this invention, it is possible to easily measure the amount of the solvent evaporation, and to prevent drying irregularities originating in the solvent evaporation before drying by executing drying treatment prior to passage of the elapsed time in which drying irregularities occur.

It is preferable that the film formation method of the first aspect of the invention further include: excluding the substrate before drying the liquid onto the substrate, based on measurement results pertaining to the elapsed time.

Consequently, according to this invention, it is possible to prevent the manufacture of defective products with a high likelihood of inferior quality by ejecting and excluding the substrate in the case where it is found that the amount of the solvent evaporation has exceeded the prescribed value based on the measurement results of elapsed time.

It is preferable that, in the film formation method of the first aspect of the invention, a boiling point of the solvent be 170° C. or higher, and an amount of inclusion of the solvent in the liquid be 90% or more.

According to this invention, it is possible in that the liquid be useful for forming an orientation film in, for example, a liquid crystal display device.

It is preferable that, in the film formation method of the first aspect of the invention, the solvent include γ-butyrolactone.

It is preferable that, in the film formation method of the first aspect of the invention, a surface tension of the liquid be in a range of 20 to 50 mN/m at 20° C.

When surface tension falls below 20 mN/m, there are the problems in that meniscus control becomes difficult, and liquid ejection becomes unstable in the liquid ejection head. When surface tension exceeds 50 mN/m, there are the problems in that filling the aforementioned head with the liquid becomes difficult, and the liquid does not spread well upon impacting the substrate. These problems can be solved by setting the surface tension of the liquid in this invention in the range of 20 to 50 mN/m.

It is preferable that, in the film formation method of the first aspect of the invention, a viscosity of the liquid be in a range of 2 to 50 mPa·s at 20° C. In the case where viscosity exceeds 50 mPa·s, there are the problems in that filling the head with the liquid and ejecting the liquid become difficult. Since, the viscosity of the liquid is in a range of 2 to 50 mPa·s in this invention, above problems can be solved.

It is preferable that, in the film formation method of the first aspect of the invention, the drying device drying the liquid ejected onto the substrate by exposing the substrate in a vacuum.

According to this invention, it is possible to dry the liquid ejected onto the substrate, since the drying device eliminates the solvent included the liquid.

A second aspect of the invention provides a method of manufacturing an electro-optical device including: ejecting liquid and forming a film on a substrate by the aforementioned film formation method.

A third aspect of the invention provides an electronic apparatus including: an electro-optical device manufactured by the aforementioned method of manufacturing an electro-optical device.

Accordingly, with the electro-optical device manufacturing method and electronic apparatus of this invention, it is possible to prevent occurrence of display irregularities originating in drying irregularities, and to obtain an electro-optical device and electronic apparatus of high quality.

BRIEF DESCRIPTION OF THE DRAWINGS

FIG. 7 is a process explanation view of one example pertaining to the method of manufacture of the liquid crystal device of FIG. 4.

DESCRIPTION OF EXEMPLARY EMBODIMENTS

Below, embodiments of the film formation method, electro-optical device manufacturing method, and electronic apparatus of this invention are described with reference to FIG. 1 to FIG. 8C.

Film Formation Method

First, a film formation device for producing film on a substrate using the film formation method of this invention is described.

Figure 1:
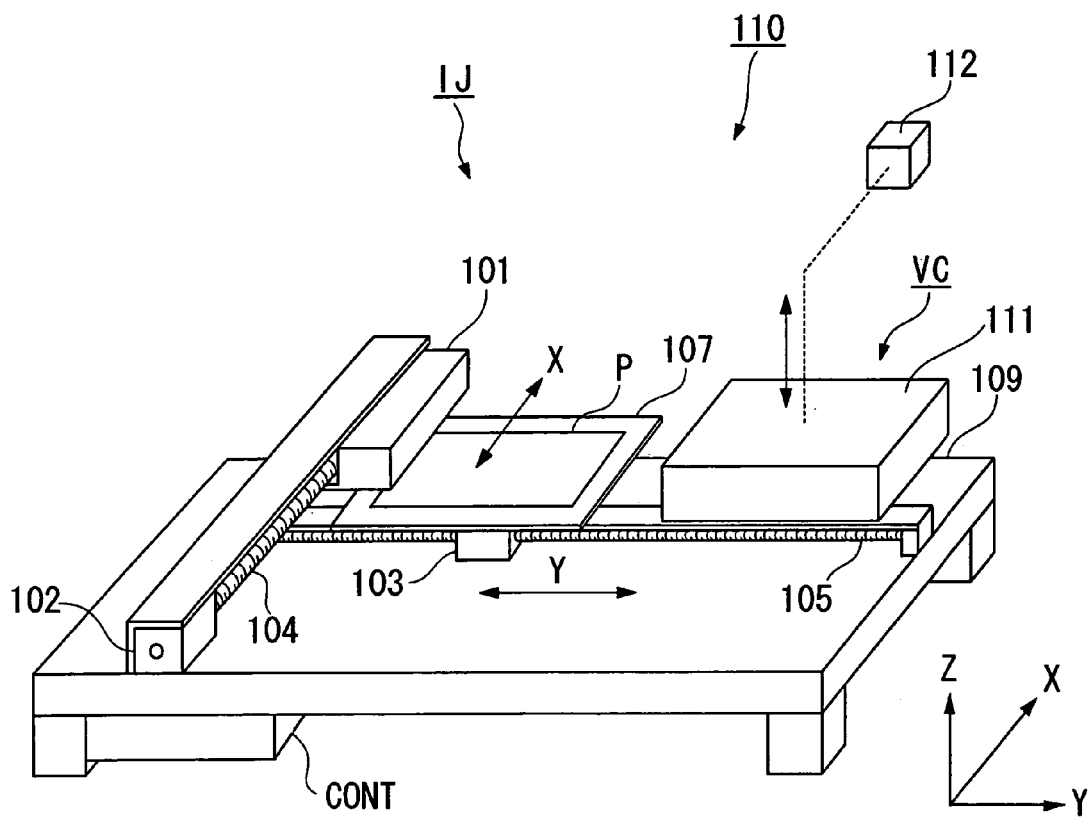
FIG. 1 is a schematic perspective view of the film formation device of this invention.

FIG. 1 is a perspective view of a schematic configuration of a film formation device 110.

The film formation device 110 is configured from a liquid droplet ejection apparatus (liquid ejection device, ink jet device) IJ for ejecting liquid droplets and applying them to a substrate P, and a drying device VC for conducting vacuum drying of the substrate to which liquid has been applied.

The liquid droplet ejection apparatus IJ is configured from a droplet ejection head 101, an X-axis drive shaft 104, a Y-axis guide shaft 105, a controller CONT, a stage 107, a cleaning mechanism (not illustrated), and a base 109.

The stage 107 supports the substrate P provided with ink (liquid) by this liquid droplet ejection apparatus IJ, and is equipped with a fixing mechanism (not illustrated) for fixing the substrate P in the standard position.

The droplet ejection head 101 is a multi-nozzle type droplet ejection head provided with a plurality of nozzles, and matches the longitudinal direction and the Y-axis direction. A plurality of ejection nozzles are provided at fixed intervals aligned in the Y-axis direction on the underside of the droplet ejection head 101. An ink is ejected from the each of ejection nozzles of the droplet ejection head 101 onto the substrate P supported by the stage 107.

As the ejection technology of the droplet ejection method, one may cite the electrification control method, pressure vibration method, electromechanical conversion method, electrothermal conversion method, electrostatic absorption method, and so on. With the electrification control method, an electric charge is imparted to the material by a charging electrode, and ejection is conducted from the nozzle while controlling the trajectory of the material by a deflecting electrode. The pressure vibration method imparts high pressure on the order of $3 \times 10^5$ Pa to the material to eject the material at the nozzle tip. If control voltage is not applied, the material proceeds directly, and is ejected from the nozzle. If control voltage is applied, electrostatic repulsion occurs in the material, with the result that the material is dispersed, and is not ejected from the nozzle. The electromechanical conversion method utilizes the property where a piezo element (piezoelectric element) is deformed by receiving pulsating electric signals, and pressure is imparted via a flexible substance to the space where the material is stored by the deformation of the piezo element, with the result that the material is pressed out from this space, and ejected from the nozzle.

Figure 2:
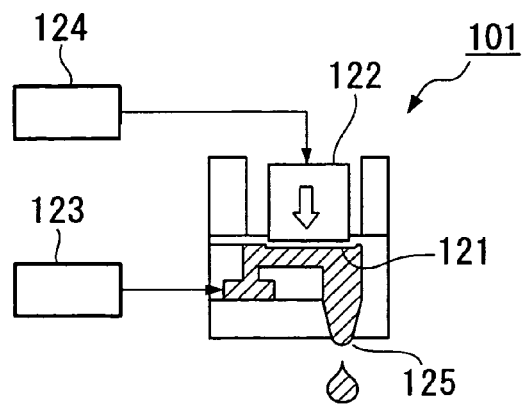
FIG. 2 is a view for explaining the principles of the liquid ejection by the piezo method.

FIG. 2 is a view that serves to explain the principles of the liquid ejection by the piezo method.

As shown in FIG. 2, a piezo element 122 is installed adjacent to a liquid chamber 121 that stores liquid material (functional liquid). The liquid material is supplied to the liquid chamber 121 via a liquid material supply system 123 that includes a material tank for storing the liquid material. The piezo element 122 is connected to a drive circuit 124, voltage is imparted to the piezo element 122 via this drive circuit 124, the liquid chamber 121 is deformed by deformation of the piezo element 122, and the liquid material is ejected from the nozzle 125. In this case, the amount of strain of the piezo element 122 is controlled by changing the value of the applied voltage to the prescribed drive waveform. Moreover, the strain speed of the piezo element 122 is controlled by varying the frequency of the applied voltage.

As the droplet ejection method, one may also adopt the bubble (thermal) method that ejects liquid material by the foam (bubbles) that occurs from heating the liquid material, but as droplet ejection by the piezo method does not impart heat to the material, it has the advantage that composition of the liquid material is not easily affected.

An X-axis-direction drive motor 102 is connected to the X-axis-direction drive shaft 104. The X-axis-direction drive motor 102 is a stepping motor or the like, and when drive signals of the X-axis direction are supplied from the controller CONT, the X-axis-direction drive shaft 104 is rotated. When the X-axis-direction drive shaft 104 is rotated, the droplet ejection head 101 is moved in the X-axis direction.

The Y-axis-direction guide shaft 105 is fixed so that it does not move relative to the base 109. The stage 107 is provided with a Y-axis-direction drive motor 103. The Y-axis-direction drive motor 103 is a stepping motor or the like, and when drive signals of the Y-axis direction are supplied from the controller CONT, the stage 107 is moved in the Y-axis direction.

Figure 3:
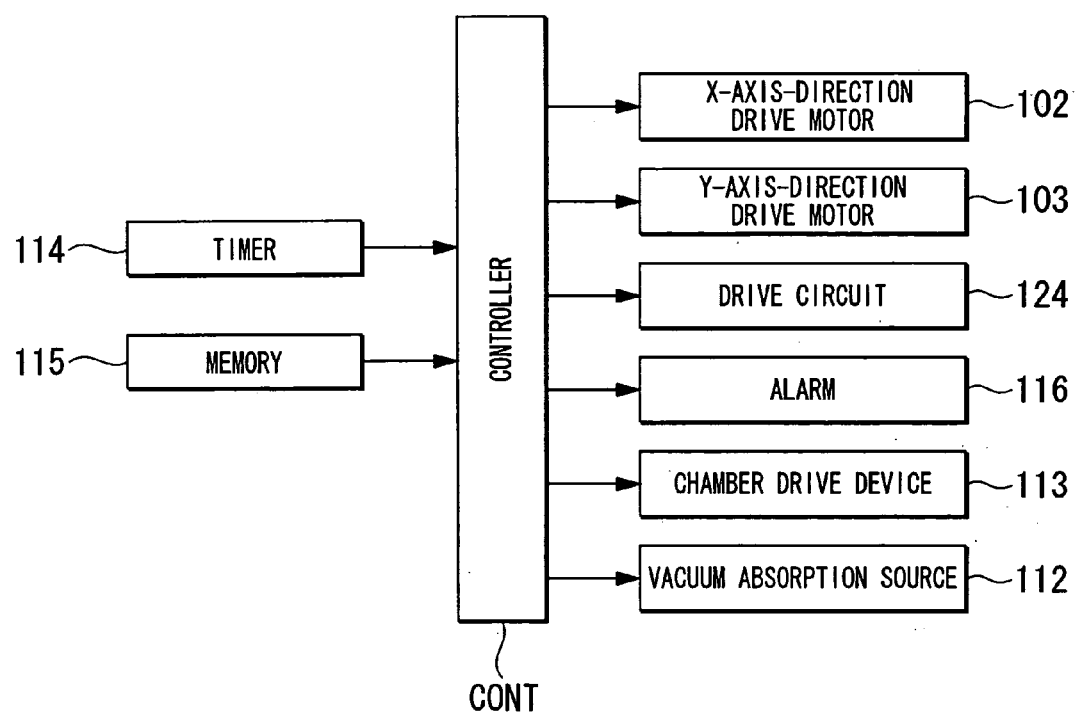
FIG. 3 is a block diagram of the control of the film formation device.

As shown in the block diagram of FIG. 3, the controller CONT supplies the voltage for ejection control of the droplets to a drive circuit 124 of the droplet ejection head 101. Moreover, drive pulse signals for controlling movement of the droplet ejection head 101 in the X-axis direction are supplied to the X-axis-direction drive motor 102, and drive pulse signals for controlling movement of the stage 107 in the Y-axis direction are supplied to the Y-axis-direction drive motor 103.

The cleaning mechanism serves to clean the droplet ejection head 101. The cleaning mechanism is provided with a Y-axis-direction drive motor (not illustrated). The cleaning mechanism is moved along the Y-axis-direction drive shaft 105 by the driving of this Y-axis-direction drive motor. Movement of this cleaning mechanism is also controlled by the controller CONT.

The liquid droplet ejection apparatus IJ ejects liquid droplets to the substrate P while conducting relative scanning of the droplet ejection head 101 and the stage 107 that supports the substrate P. In the below explanation, the Y-axis direction is the scanning direction, and the X-axis direction that is perpendicular to the Y-axis direction is the non-scanning direction. Accordingly, the ejection nozzles of the droplet ejection head 101 are provided so that they are aligned at fixed intervals in the X-axis direction which is the non-scanning direction. As shown in FIG. 1, the droplet ejection head 101 is arranged perpendicular to the direction of advancement of the substrate P, and it is acceptable to adjust the angle of the droplet ejection head 101 so that it crosses the direction of advancement of the substrate P. If this is done, it is possible to regulate pitch among the nozzles by adjusting the angle of the droplet ejection head 101. It may be freely set distance between the substrate P and the nozzle face.

The drying device VC is configured from a vacuum chamber 111, and a vacuum absorption source 112 for conducting vacuum absorption (negative pressure absorption) relative to the vacuum chamber 111 under the control of the controller CONT (see FIG. 3). The vacuum chamber 111 is freely moved in the Z-axis direction by a chamber drive device 113 (not illustrated in FIG. 1; see FIG. 3) included an actuator such as an air cylinder controlled by the controller CONT. A space surrounded by the vacuum chamber 111 and the stage 107 is closed, when the chamber 111 descends opposite the stage 107, and the chamber 111 touches to the stage 107.

As shown in FIG. 3, a timer 114 is provided in the film formation device 110.

The timer 114 measures elapsed time from the start of ejecting of the liquid by the droplet ejection head 101, and conducts output to the controller CONT. A memory 115 that stores the threshold value of the time in which the solvent evaporates as information relating to the amount of the solvent evaporation of the liquid is connected to the controller CONT, and controls operation of an alarm 116 based on the result of comparison of this threshold value and the measurement result of the timer 114.

Next, the film production operations of the film formation device 110 of the above configuration are described.

Here, a description is given concerning the case where an orientation film used in a liquid crystal-display device is produced.

First, the preparation process before droplet ejection is described. In order to form orientation film by droplet ejection method, in addition to the orientation regulation capability, voltage retention properties and afterimage properties of the liquid crystal, it is important to have small resistance and superior fluidity when strong external force is applied to the solution. In this embodiment, as the liquid containing orientation-film-forming material, a solution is used that has a solid portion based on polyamic acid, and that contains 90% or more of solvent (resolvent) whose primary solvent is γ-butylolactone (boiling point: 204° C., viscosity at 20° C.: 2 mPa·s, surface tension at 20° C.: 42 mN/m) (in this case, the solid concentration is 1.6%).

In this case, evaporation speed τ when the solvent surface is exposed in a vacuum is calculated by the following formula when pressure is P (Pa), T is temperature, and M is molecular weight.

$$\tau = 4.35 \times 10^{-4} \times P \times \sqrt{(M/T)} \quad (1)$$

When the saturated vapor pressure of γ-butylolactone is 200 Pa, and a molecular weight of 82 is used, one obtains $\tau = 0.05$ g/cm²·s from formula (1) as the evaporation speed of γ-butylolactone in a vacuum. In a vacuum, the evaporation progresses at $1 \times 10^6$ times that of an atmospheric pressure environment. Consequently, the evaporation speed of γ-butylolactone under atmospheric pressure is $\tau = 5 \times 10^{-8}$ g/cm²·s.

The relation of the amount of the solvent evaporation around the chip on substrate P, the elapsed time after application to substrate P, and the evaporation rate is shown by the following table (the aforementioned the amount of the solvent evaporation and the aforementioned elapsed time are in a proportional relation).

TABLE

| | Elapsed time | | | |
|---|---|---|---|---|
| | 1 second | 60 seconds | 180 seconds | 300 seconds |
| Amount of evaporation | 0.0011 mg | 0.066 mg | 0.198 mg | 0.33 mg |
| Evaporation rate | 0.2% | 13% | 40% | 66% |
| Display quality | OK | OK | OK | NG |

When the liquid crystal display device was manufactured under various conditions, and display quality was confirmed, it was found that display irregularities occur when the amount of the solvent evaporation exceeds 40%.

Thus, the 180 seconds of elapsed time until the amount of the solvent evaporation reaches 40% is set as the threshold value, and stored in the memory 115.

The orientation film formation process is described below.

The X-axis-direction drive motor 102 and Y-axis-direction drive motor 103 are driven, relative positioning of the substrate P and droplet ejection head 101 is conducted at the prescribed positions, and the droplets of liquid (ink) for formation of the aforementioned orientation film are ejected from the nozzle 124 while scanning the substrate P in one direction (Y-axis direction) relative to the droplet ejection head 101. In this instance, the target values are set at 45 nm of film thickness relative to 1.5 cm×1.5 cm of rectangular film production area (approximately 2.25 cm²), and 0.5 mg of liquid is ejected.

The substrate P to which the liquid has been applied is aged for the prescribed time (delay time), and the liquid levels. When the substrate P on which the liquid has leveled is moved to a position opposite the vacuum chamber 111 by the driving of the Y-axis-direction drive motor 103, an absorption space is formed between the stage 107 and the vacuum chamber 111 by having the vacuum chamber 111 descend until it contacts the stage 107 by the driving of the chamber driver 113. Subsequently, the controller CONT creates a vacuum in the absorption space by operating the vacuum absorption source 112, and the liquid on the substrate P is vacuum dried. At this point, elapsed time from starting the ejecting of the liquid is timed by the timer 114, and outputted to the controller CONT.

The controller CONT compares the outputted elapsed time and the threshold value of the amount of the solvent evaporation stored in the memory 115. In the case where the elapsed time does not exceed the threshold value, it is judged that the amount of the solvent evaporation of the liquid is within the specified value, and the substrate P is sent to the drying process (the position opposite the vacuum chamber 111). In the case where unexpected circumstances arise, and it is judged that the time required for leveling exceeds the threshold value, the controller CONT shortens the delay time for leveling, and commences the drying process. Conversely, in the case where unexpected circumstances arise, and elapsed time has exceeded the threshold value (that is, in the case where it is judged that the amount of the solvent evaporation has exceeded 40%), it is judged that the amount of the solvent evaporation of the liquid has exceeded the specified value, a warning (alarm) is issued by the alarm 116 to the operator (worker) or the like, the pertinent substrate P is ejected from the film formation device 110 by the substrate conveyor (not illustrated), and the pertinent substrate P is prevented from being sent to the drying process.

Thus, according to this embodiment, information relating to the amount of the solvent evaporation of the liquid ejected to the substrate P is measured, and arrangements are made so that the amount of the solvent evaporation does not exceed 40%. Consequently, it is possible to execute various types of measures such as the issuance of alarms against a substrate P with a high likelihood of occurrence of drying irregularities due to an amount of the solvent evaporation exceeding the specified value (40%). As a result, with this embodiment, it is possible to prevent beforehand the manufacture of electro-optical devices and electronic apparatus using a substrate P on which drying irregularities have occurred. In particular, with this embodiment, the amount of the solvent evaporation of the liquid is measured as elapsed time after liquid ejection, with the result that it is possible to easily and rapidly obtain the amount of the solvent evaporation by a simple configuration.

According to this embodiment, a warning is issued by the alarm 116 in the case where the amount of the solvent evaporation during leveling of the liquid exceeds the specified value, with the result that it is possible to quickly and reliably learn of the occurrence of a defective substrate. By ejecting the pertinent substrate P from the film formation device 110, it is possible to contribute to improved productivity by eliminating the need for suspending the manufacturing line, and operators become unnecessary, thereby contributing to cost reduction. In addition, according to this embodiment, a configuration is adopted where the threshold value of the solvent evaporation time is stored in advance in the memory 115, with the result that it becomes possible to easily set an optimal threshold value according to the type of liquid and the environment at the time of droplet ejection and at the time of leveling, and it is possible to conduct optimal film formation according to conditions.

Furthermore, according to this embodiment, as orientation film is formed by the droplet ejection method, the amount of material consumption and amount of liquid drainage are greatly reduced compared to the flexo method and the spin coating method, energy conservation effects can be anticipated, and it is also possible to accommodate enlargement of the substrate P.

When the surface tension of the liquid used in droplet ejection falls below 20 mN/m at, for example, 20° C., there is the problem in that meniscus control becomes difficult, and that liquid ejection becomes unstable, while when surface tension exceeds 50 mN/m, there are the problems in that filling the aforementioned head 101 with the liquid becomes difficult, and that the liquid does not easily spread upon impacting the substrate P. In this embodiment, however, γ-butylolactone with a surface tension of approximately 42 mN/m is used, thereby enabling solution of such problems. Furthermore, in the case where the viscosity of the liquid exceeds 50 mPa·s at, for example, 20° C., there is the problem in that the liquid ejection becomes difficult. In this embodiment, however, the viscosity of the γ-butylolactone is 2 mPa·s, thereby enabling solution of this problem.

As the solvent contained in the solution for droplet ejection, it is acceptable to use the aforementioned γ-butylolactone alone. In addition to the γ-butylolactone, one may use N-methyl-2-pyrolidone (boiling point: 202° C., viscosity at 20° C.: 2 mPa·s, surface tension at 20° C.: 41 mN/m, saturated vapor pressure: 38 Pa), butylcellosorb (boiling point: 170° C., viscosity at 20° C.: 3 mPa·s, surface tension at 20° C.: 27 mN/m, saturated vapor pressure: 113 Pa), N-N dimethylacetoamide (boiling point: 166° C., viscosity at 20° C.: 1 mPa·s, surface tension at 20° C.: 32 mN/m, saturated vapor pressure: 173 Pa) and the like, or a mixture of these. If the content of these solvents in the liquid (solution) is 90% or more, application as the liquid ordinarily used when applying orientation film in, for example, a liquid crystal display device becomes possible.

As all of these solvents have a surface tension at 20° C. which is in the range of 20 to 50 mN/m and a viscosity at 20° C. which is in the range of 2 to 50 mPa·s, it is possible to solve the problems where the liquid ejection becomes difficult, the liquid ejection becomes unstable, filling the head 101 with the liquid becomes difficult, and the liquid does not easily spread upon impacting the substrate.

Liquid Crystal Display Device

Next, a description is made of a liquid crystal panel (device) and a liquid crystal device (electro-optical device) provided with the pertinent liquid crystal panel, which are manufactured using the above-described film formation device.

Figure 4:
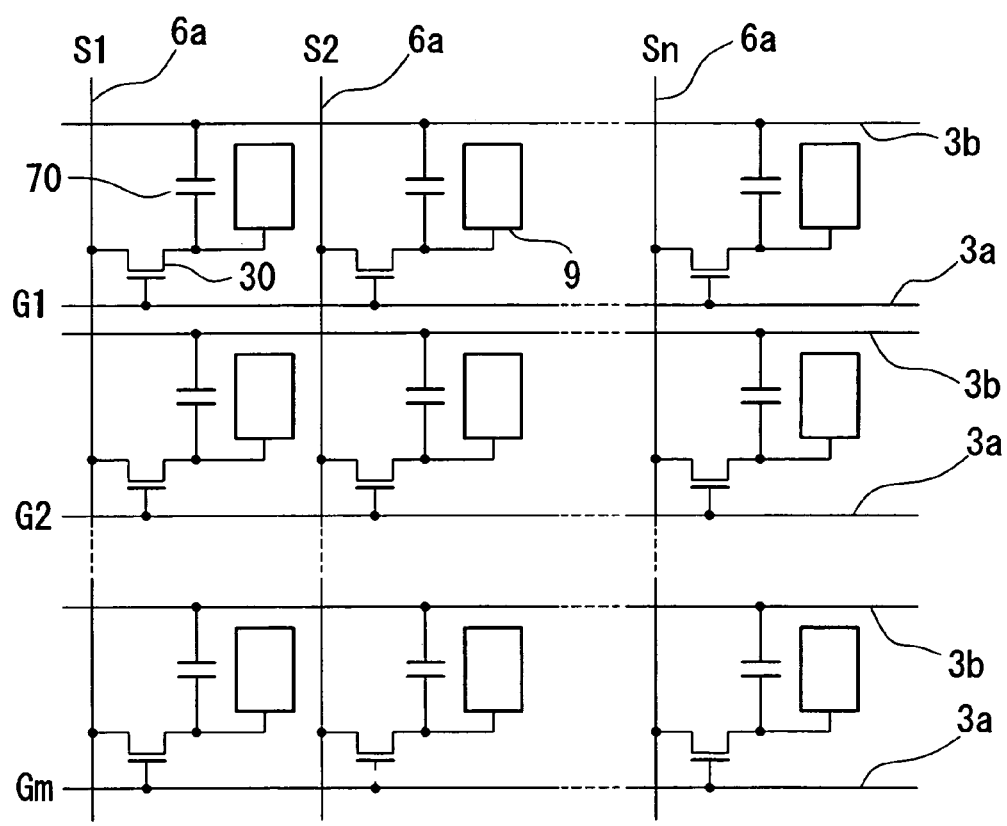
FIG. 4 is an equivalent circuit diagram of a liquid crystal device.
Figure 5:
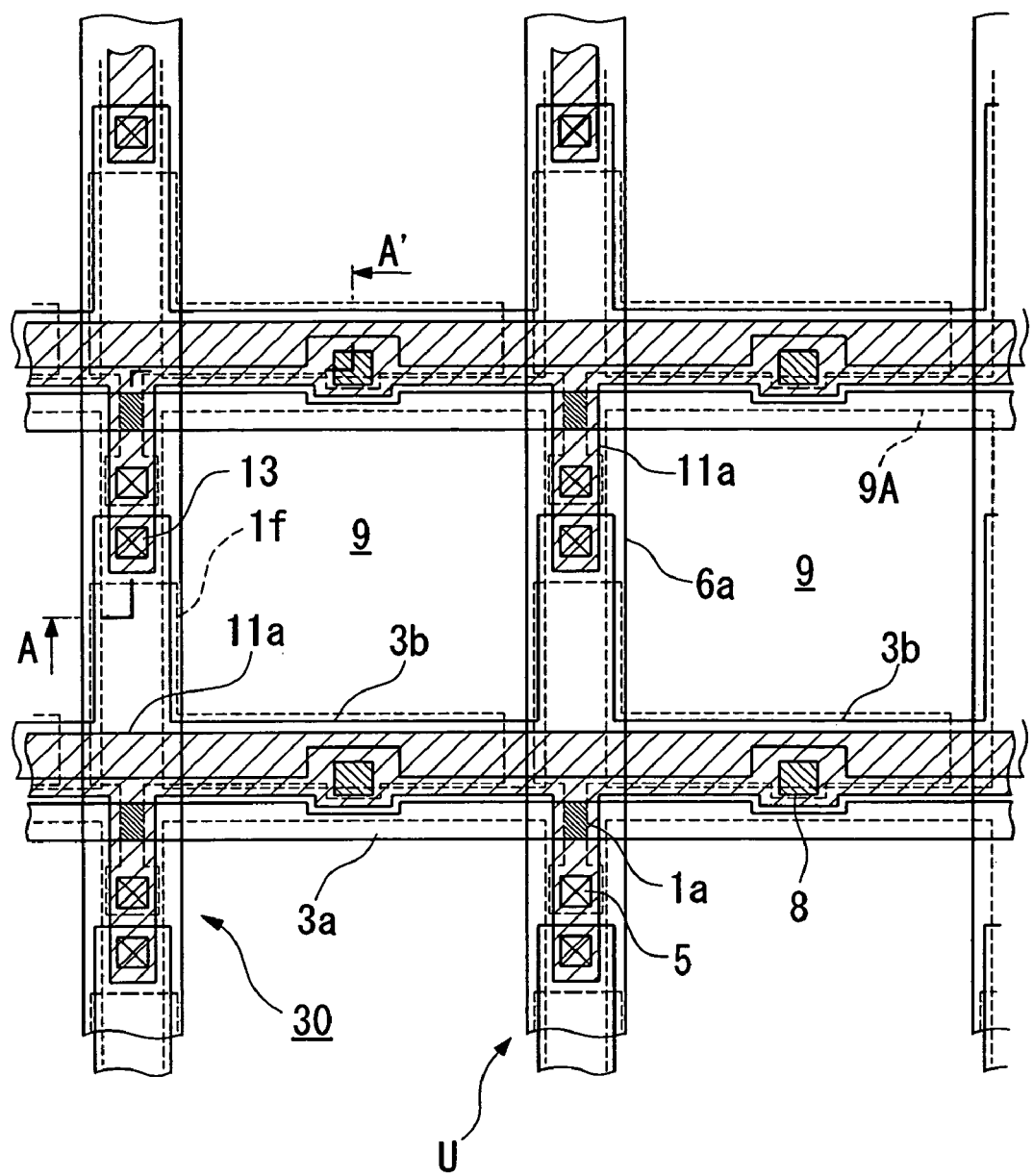
FIG. 5 is a plan view of the pixel structure pertaining to the liquid crystal device of FIG. 4.
Figure 6:
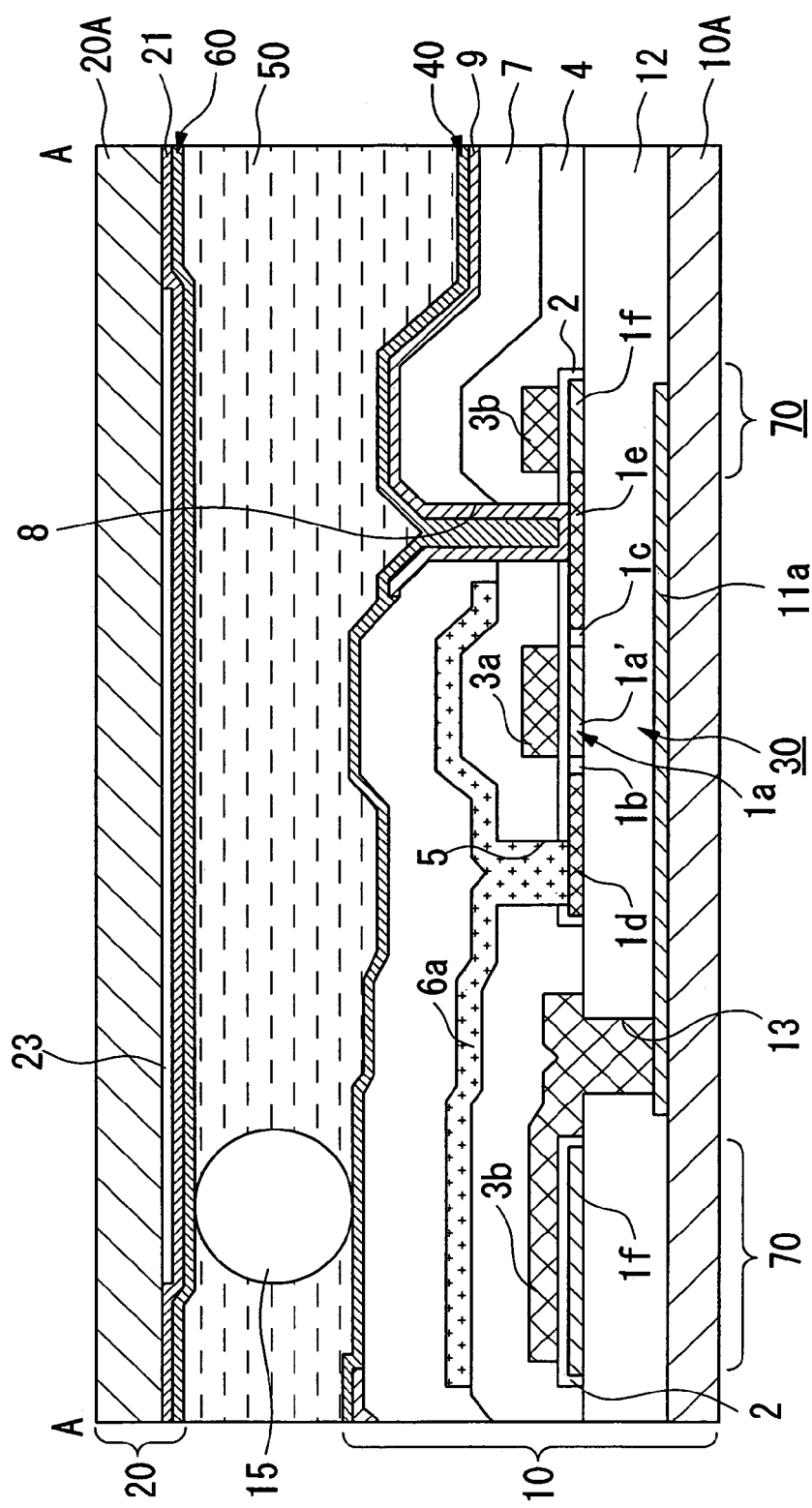
FIG. 6 is a cross-sectional view of the essential portion of the liquid crystal device of FIG. 4.

The liquid crystal display device which serves as the electro-optical device of the embodiment shown in FIG. 4 to FIG. 6 is a transmission type liquid crystal device of the active matrix type using TFT (thin film transistor) elements as the switching elements. FIG. 4 is an equivalent circuit diagram of the switching elements, signal lines and the like of a plurality of pixels arranged in matrix form in the permeable liquid crystal device of this embodiment. FIG. 5 is a plan view of essential portion showing the configuration of the plurality of mutually adjoining pixel groups of a TFT array substrate formed by data lines, scanning lines, pixel electrodes and the like. FIG. 6 is a cross-sectional view taken along the line A-A' of FIG. 5. As shown in FIG. 6, the view is for the case where the top side of the view is the side of light incidence, and the bottom side of the view is the observation side (observer side).

In each figure, the reduction scale is varied for each layer and each member so that each layer and each member has a size that is discernable in the drawing.

In the liquid crystal display device of this embodiment, as shown in FIG. 4, a pixel electrode 9 and a TFT element 30 which is a switching element for controlling excitation of the pertinent pixel electrode 9 are respectively formed in a plurality of pixels arranged in matrix format. A data line 6a that supplies image signals is electrically connected to the source of the pertinent TFT element 30. Image signals S1, S2, . . . , Sn which are written in the data lines 6a are supplied in line sequence in this sequence, or are supplied in groups relative to a plurality of mutually adjoining data lines 6a.

The scanning lines 3a are electrically connected to the gate of the TFT element 30, and scanning signals G1, G2, . . . Gm are applied in pulses in line sequence at the prescribed timing to a plurality of scanning lines 3a. The pixel electrode 9 is electrically connected to the drain of the TFT element 30, and image signals S1, S2, . . . , Sn supplied from data line 6a are written at the prescribed timing by turning on the TFT element 30 which is the switching element for a fixed period only.

Image signals S1, S2, . . . , Sn of the prescribed level which are written in the liquid crystal via the pixel electrode 9 are retained for a fixed period between the pixel electrode 9 and the below-mentioned shared electrode. The liquid crystal modulates the light, and enables graduated display by varying the orientation and order of the molecular aggregates according to the applied voltage level. Here, in order to prevent leakage of the retained image signals, the stored capacity is added in parallel with the liquid crystal capacity formed between the pixel electrode 9 and the shared electrode.

Next, the planar configuration of the essential portion of the liquid crystal display device of this embodiment is described based on FIG. 5. As shown in FIG. 5, a plurality of rectangular pixel electrodes (the contours are shown by the dotted line parts 9A) made from transparent conductive material such as indium tin oxide (hereinafter abbreviated as ITO) are provided in matrix format on a TFT array substrate. Data lines 6a, a scanning line 3a and a capacity line 3b are provided along the respective vertical and horizontal boundaries of the pixel electrode 9. In this embodiment, the region formed by each pixel electrode 9 and the data lines 6a, scanning line 3a, capacity line 3b and the like arranged so as to surround each pixel electrode 9 constitutes the pixel, and is a configuration enabling display to be conducted for each of the pixels arranged in matrix format. The region forming a lattice in the vertical and horizontal directions formed by the data lines 6a, scanning line 3a, capacity line 3b and the like surrounding each pixel electrode 9 constitutes the non-display region U in which image display is not conducted.

The data line 6a is electrically connected via a contact hole 5 to the below-mentioned source region in a semiconductor layer 1a consisting of, for example, polysilicon film configuring the TFT element 30, while the pixel electrode 9 is electrically connected via a contact hole 8 to the below-mentioned drain region in the semiconductor layer 1a. Moreover, in the semiconductor layer 1a, the scanning line 3a is disposed so as to face the below-mentioned channel region (the region indicated in the drawing by diagonal lines rising to the left). The portion of the scanning line 3a that faces the channel region functions as a gate electrode.

The capacity line 3b has a main line portion extending in an substantially linear manner along scanning line 3a (that is, the first region formed along scanning line 3a viewed in a planar manner) and a projecting portion that projects toward the front step side (upward in the drawing) along scanning line 6a from the place of intersection with scanning line 6a (that is, the second region extending along scanning line 6a viewed in a planar manner). As shown in FIG. 5, a plurality of first anti-glare films 11a are provided in the regions shown by diagonal lines rising to the right.

Next, the sectional configuration of the liquid crystal display device of this embodiment is described based on FIG. 6. FIG. 6 is a cross-sectional view taken along the line A-A' of FIG. 5 as stated above, and is a cross-sectional view of the configuration of the region formed by the TFT element 30. In the liquid crystal device of this embodiment, a liquid crystal layer 50 is held between a TFT array substrate 10 and an opposite substrate 20 arranged opposite this.

The liquid crystal layer 50 is composed, for example, of liquid crystal that mixes one type or several types of nematic liquid crystal, and adopts the prescribed orientation condition between a pair of orientation films 40 and 60. The TFT array substrate 10 is primarily configured from a substrate body 10A composed of translucent material such as quartz, and the TFT element 30, pixel electrode 9 and orientation film 40 formed on the surface of the substrate body 10A on the liquid crystal layer 50 side. The opposite substrate 20 is primarily configured from a substrate body 20A composed of translucent material such as glass or quartz, and a shared electrode 21 and orientation film 60 formed on the surface of the substrate body 20A on the liquid crystal layer 50 side. The respective substrates 10 and 20 are maintained at the prescribed substrate spacing via a spacer 15.

In the TFT array substrate 10, the pixel electrodes 9 are provided on the surface of the substrate body 10A on the liquid crystal layer 50 side, and the TFT element 30 for pixel switching that conducts switching control of each pixel electrode 9 is provided at positions adjacent to each pixel electrode 9. The TFT element 30 for pixel switching has an LDD (Lightly Doped Drain) configuration, and is provided with the scanning line 3a; a channel region 1a' of the semiconductor layer 1a that forms a channel according to the electric field of the scanning line 3a; a gate insulating film 2 that insulates the scanning line 3a and the semiconductor layer 1a; the data line 6a; a low concentration source region 1b and low concentration drain region 1c of the semiconductor layer 1a; and a high concentration source region 1d and high concentration drain region 1e of the semiconductor layer 1a.

On the substrate body 10A including on the aforementioned scanning line 3a and on the gate insulating film 2, a second interlayer insulating film 4 is formed, which is perforated by the contact hole 5 that accesses the high concentration source region 1d and the contact hole 8 that accesses the high concentration drain region 1e. In short, the data line 6a is electrically connected to the high concentration source region 1d via the contact hole 5 that transits the second interlayer insulating film 4.

Furthermore, on the data line 6a and on the second interlayer insulating film 4, the third interlayer insulating film 7 is formed, which is perforated by the contact hole 8 that accesses the high concentration drain region 1e. That is, the high concentration drain region 1e is electrically connected to the pixel electrode 9 via the contact hole 8 that transits the second interlayer insulating film 4 and the third interlayer insulating film 7.

In the region formed by each TFT element 30 for pixel switching on the surface of the substrate body 10A of the TFT array substrate 10 on the liquid crystal layer 50 side, the first anti-glare film 11a is provided whereby reflected light that transits the TFT array substrate 10, that is reflected by the illustrated bottom surface of the TFT array substrate 10 (the boundary face of the TFT array substrate 10 and air), and that returns toward the liquid crystal layer 50 side is prevented from reaching at least the channel region 1a' as well as the low concentration region and drain region 1b and 1c of the semiconductor layer 1a.

Between the first anti-glare film 11a and the TFT element 30 for pixel switching, a first interlayer insulating film 12 is formed for purposes of electrically insulating the semiconductor layer 1a that composes the TFT element 30 for pixel switching from the first anti-glare film 11a. Furthermore, as shown in FIG. 5, in addition to providing the first anti-glare film 11a on the TFT array substrate 10, the first anti-glare film 11a is configured so as to electrically connect to the front step or rear step of the capacity line 3b via a contact hole 13.

Furthermore, the orientation film 40 for controlling the orientation of liquid crystal molecules in the liquid crystal layer 50 when voltage is not applied is formed on the outermost surface of the TFT array substrate 10 on the liquid crystal layer 50 side, that is, on top of the pixel electrode 9 and third interlayer insulating film 7. Accordingly, in the region provided with this type of TFT element 30, there is a configuration that forms a plurality of irregularities or level differences on the outermost surface of the TFT array substrate 10 on the liquid crystal layer 50 side, that is, the interstitial surface of the liquid crystal layer 50.

On the other hand, on the opposite substrate 20, a second anti-glare film 23 for preventing incoming light from entering the channel region 1a' as well as the low concentration source region 1b and low concentration drain region 1c of the semiconductor layer 1a of the TFT element 30 for pixel switching is provided on the outermost surface of the substrate body 20A on the liquid crystal layer 50 side in the region opposite the formation region of the data line 6a, scanning line 3a and TFT element 30 for pixel switching, that is, in the region apart from the apertured regions of each pixel part. Furthermore, the shared electrode 21 composed of ITO or the like is formed on the liquid crystal layer 50 side of the substrate body 20A formed by the second anti-glare film 23, and extends across almost the entire surface, while the orientation film 60 for controlling the orientation of the liquid crystal molecules in the liquid crystal layer 50 when voltage is not applied is formed on the liquid crystal layer 50 side thereof.

Method of Manufacturing Liquid Crystal Display Device

Next, an example of the method of manufacture of a liquid crystal display device consisting of the aforementioned liquid crystal device of this embodiment is described with reference to drawings.

FIG. 7 is an explanatory view of the process flow pertaining to the method of manufacture of the liquid crystal display device of this embodiment. That is, this manufacturing method forms orientation film on a pair of substrates, conducts rubbing treatment on this orientation film, and forms frame-shaped sealing material in one of the substrates, after which liquid crystal is dripped into this sealing material frame, and the other substrate is affixed. Each step in the flow is described in detail below.

First, as shown in step S1 of FIG. 7, in order to configure the TFT element 30 and the like on the underside of the substrate body 10A composed of glass or the like, one forms the anti-glare film 11a, first interlayer insulating film 12, semiconductor layer 1a, channel region 1a', low concentration source region 1b, low concentration drain region 1c, high concentration source region 1d, high concentration drain region 1e, stored capacity electrode 1f, scanning line 3a, capacity line 3b, second interlayer insulating film 4, data line 6a, third interlayer insulating film 7, contact hole 8, and pixel electrode 9.

Next, as shown in step S2 of FIG. 7, the orientation film solution is applied onto the substrate body 10A using the above-described film formation device 110, and the orientation film 40 is formed.

Subsequently, as shown in step S3 of FIG. 7, the orientation film 40 is subjected to rubbing treatment in the prescribed direction, and the TFT array substrate 10 is prepared. In addition, the anti-glare film 23, opposite electrode 21 and orientation film 60 are formed on the top side of the substrate body 20A, and the aforementioned orientation film 60 is subjected to rubbing treatment in the prescribed direction to prepare the opposite substrate 20.

Next, in step S4 of FIG. 7, frame-shaped sealing material is formed on the aforementioned opposite substrate 20 or on the TFT array substrate 10. As the sealing material, one may use ultraviolet ray hardened resin and the like. This is formed into a frame by the printing method or the like, and forms a closed frame shape devoid of liquid crystal injection ports. At this point, in order to maintain the prescribed substrate spacing, it is acceptable to disperse the spacer 15 in the sealing material so as to maintain the prescribed substrate spacing.

Next, in step S5 of FIG. 7, the prescribed amount of liquid crystal corresponding to the cell thickness of the pertinent liquid crystal device is dripped onto the TFT array substrate 10 in which the sealing material is formed. Thereafter, in step S6 of FIG. 7, the TFT array substrate 10 onto which the liquid crystal was dripped and the opposite substrate 20 of the other side are fixed together so as to sandwich the liquid crystal, and optical films such as a phase difference plate and deflecting plate (not illustrated) are also affixed to the outer surface of the TFT array substrate 10 and opposite substrate 20 to manufacture the liquid crystal device which is the display device provided with the cell configuration shown in FIG. 6.

In the aforementioned liquid crystal device, the orientation films 40 and 60 are produced by ejecting and drying droplets of solution containing orientation film forming material using the above-described film formation device 110. In addition, apart from the orientation films 40 and 60, one may also form the liquid crystal layer 50 as well as an overcoat film, color filter and the like (not illustrated) using the above-described film formation device 110.

Accordingly, with the liquid crystal device of this embodiment, it is possible to prevent declines in display quality due to the occurrence of display irregularities originating in drying irregularities.

In addition, according to this embodiment, the orientation films and the like are formed by the droplet ejection method, with the result that the amount of material consumption and amount of liquid drainage are greatly reduced compared to the flexo method, there is a major energy conservation effect, one can easily accommodate enlargement of the substrate P, and it is possible to produce film of high quality.

Moreover, the film formation device 110 of this invention may be applied not only to manufacture of the above-described liquid crystal panel, but also, for example, to manufacture of other electro-optical devices such as organic EL devices that use organic functional layers emitting light by the flow-through of current as the pixels. In the case where this invention is applied to organic EL devices, the organic functional layers are formed by the droplet ejection apparatus pertaining to this invention.

Furthermore, apart from liquid crystal panels and organic EL devices, application may also be made to metal wiring and organic thin film transistors, resist and microlens arrays, and the biotech field.

For example, as the solvent used when forming the organic functional layer of the organic EL device, one may cite methylene (boiling point: 164° C., viscosity at 20° C.: 1 mPa·s, surface tension at 20° C.: 28 mN/m, saturated vapor pressure: 1330 Pa), cyclohexylbenzene (boiling point: 240° C., viscosity at 20° C.: 4 mPa·s, surface tension at 20° C.: 35 mN/m, saturated vapor pressure: 133 Pa), and xylene (boiling point: 140° C., viscosity at 20° C.: 1 mPa·s).

As the solvent used when forming metal wiring, on may cite decane (boiling point: 1740° C., viscosity at 20° C.: 1 mPa·s, surface tension at 20° C.: 24 mN/m, saturated vapor pressure: 1330 Pa).

Electronic Apparatus

Figure 8A:
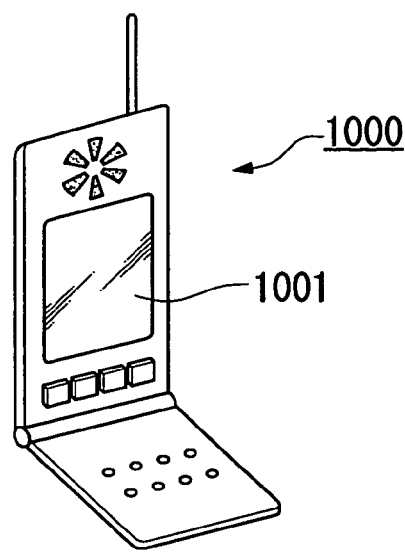
FIGS. 8A to 8C are perspective views of examples of the electronic apparatus of this invention.
Figure 8B:
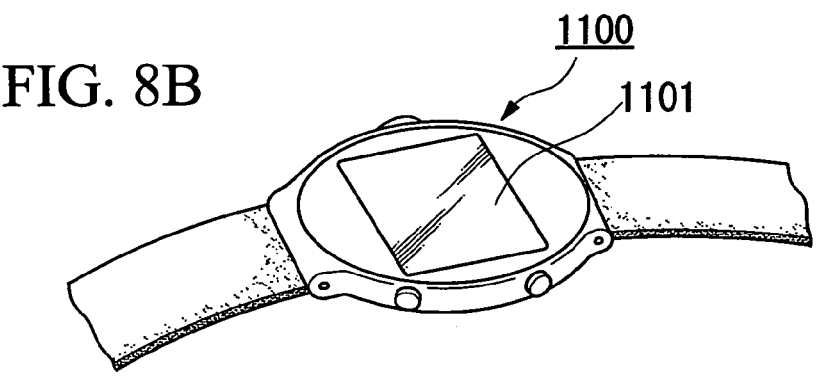
Figure 8C:
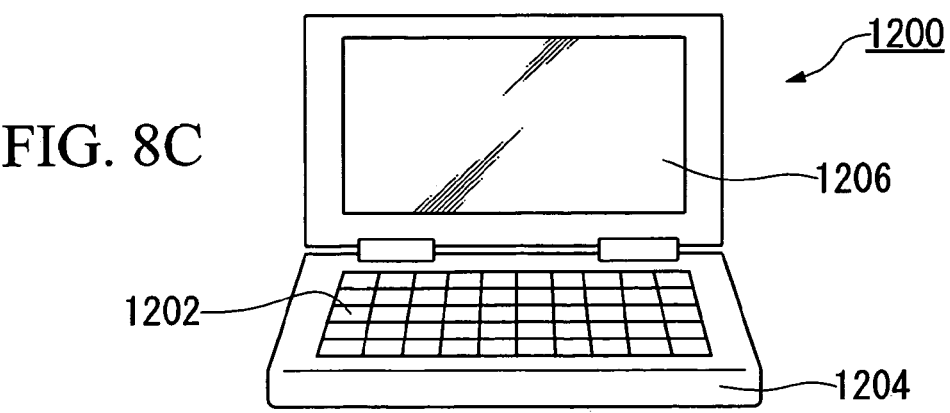

FIGS. 8A to 8C show embodiments of the electronic apparatus of the invention.

These examples of electronic apparatus are provided with the aforementioned liquid crystal devices as display device.

FIG. 8A is a perspective view of one example of a cell phone. As shown in FIG. 8A, reference numeral 1000 indicates the cell phone body, and reference numeral 1001 indicates the display unit using the aforementioned liquid crystal device.

FIG. 8B is an oblique view of one example of electronic apparatus of the wristwatch type. As shown in FIG. 8B, reference numeral 1100 indicates the wristwatch body, and reference numeral 1101 indicates the display unit using the aforementioned liquid crystal device.

FIG. 8C is an oblique view of one example of a portable information processing device such as a personal computer. As shown in FIG. 8C, reference numeral 1200 indicates the information processing device, reference numeral 1202 indicates the input unit such as a keyboard, reference numeral 1204 indicates the information processing device body, and reference numeral 1206 indicates the display unit using the aforementioned liquid crystal device.

As the respective examples of electronic apparatus shown in FIGS. 8A to 8C are provided with the aforementioned liquid crystal device as the display devices, it is possible to obtain electronic apparatus of high quality without display irregularities.

While preferred embodiments of the invention have been described and illustrated above, it should be understood that these are exemplary of the invention, and are not to be considered as limiting. Additions, omissions, substitutions, and other modifications can be made without departing from the spirit or scope of the invention. Accordingly, the invention is not to be considered as being limited by the foregoing description, and is only limited by the scope of the appended claims.

For example, in the aforementioned embodiment, the description used the case of a configuration where a warning is issued if the amount of the solvent evaporation exceeds the prescribed value and a configuration for ejection from the film formation device, but apart from this, one may also adopt a configuration where the controller CONT stores the ID of the pertinent substrate P in the memory 115, and the substrate P with the pertinent ID is ejected after completion of all after-treatment including drying treatment.

Furthermore, in the aforementioned embodiment, the description used the case of an alarm as the warning, but one is not limited thereto. For example, one may also adopt a configuration where a display device (CRT, liquid crystal display, etc.) connected to the controller CONT is installed, and the warnings are displayed on this display device.

What is claimed is:

1. A manufacturing method of a display device provided with a film formed by ejecting a liquid onto a substrate and drying the liquid, the method comprising:
   evaluating the impact of an evaporation rate of a solvent included in the liquid on a display quality of the display device;
   storing an elapsed time, as a threshold value, from ejection of the liquid onto the substrate to when the evaporation of the solvent causes display irregularities to the display device;
   ejecting the liquid onto the substrate;
   moving the substrate on which the liquid is ejected to a drying device;
   drying the liquid using the drying device to form the film; and
   determining whether an elapsed time after ejecting the liquid onto the substrate exceeds the threshold value or not, between the step of ejecting the liquid and the step of moving the substrate,
   wherein in determining whether the elapsed time after ejecting the liquid onto the substrate exceeds the threshold value or not, if the elapsed time has exceeded the threshold value, a warning is issued by an alarm or the substrate is carried out of a film formation device to prevent the substrate from moving to the drying device.

2. The manufacturing method of a display device according to claim 1, wherein a boiling point of the solvent is 170° C. or higher.

3. The manufacturing method of a display device according to claim 1, wherein an amount of inclusion of the solvent in the liquid is 90% (v/v) or more.

4. The manufacturing method of a display device according to claim 1, wherein the solvent includes γ-butyrolactone.

5. The manufacturing method of a display device according to claim 1, wherein a surface tension of the liquid is in a range of 20 to 50 mN/m at 20° C.

6. The manufacturing method of a display device according to claim 1, wherein a viscosity of the liquid is in a range of 2 to 50 mPa·s at 20° C.

7. The manufacturing method of a display device according to claim 1, wherein the drying device drying the liquid ejected onto the substrate by exposing the substrate in a vacuum.

8. The manufacturing method of a display device according to claim 1, wherein
   the liquid includes a solid portion based on polyamic acid and a γ-butylolactone as a primary solvent, and
   a boiling point of the γ-butylolactone is 204° C., a viscosity of the γ-butylolactone at 20° C. is 2 mPa·s and a surface tension of the γ-butylolactone at 20° C. is 42 mN/m; and
   the evaporation rate where the display irregularities of the display device occurs are greater than 40%.

9. The manufacturing method of a display device according to claim 1, further comprising:
   leveling the liquid by resting the substrate on which the liquid is applied for a predetermined time,
   wherein in determining the elapsed time after ejecting the liquid onto the substrate exceeds the threshold value or not, if the elapsed time is longer than the threshold value and the predetermined time is longer than the threshold value, the substrate is then moved to the drying device and the liquid is dried before the predetermined time has passed.

* * * * *